Dec. 31, 1957     M. A. BERGSTEDT     2,818,169
ADHESIVE SHEET
Filed Aug. 17, 1954
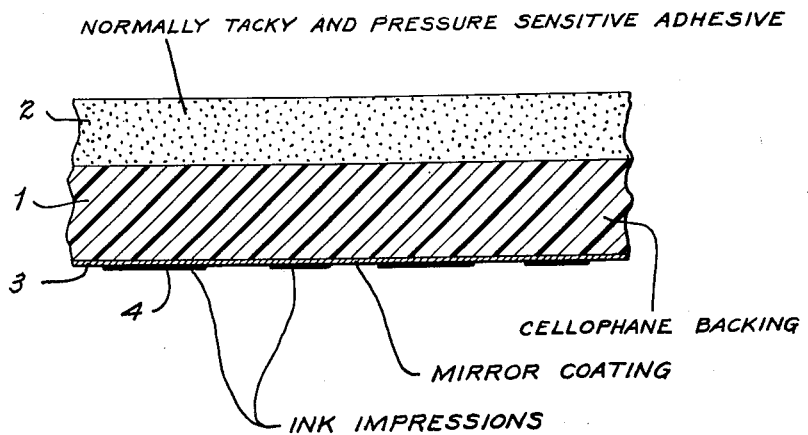
INVENTOR.
MILTON ALFRED BERGSTEDT
BY
ATTORNEY

United States Patent Office 2,818,169
Patented Dec. 31, 1957

2,818,169

ADHESIVE SHEET

Milton Alfred Bergstedt, Linden, N. J., assignor to Permacel Le Page's Inc., a corporation of New Jersey Application August 17, 1954, Serial No. 450,546

5 Claims. (Cl. 206—59)

This invention relates to printed adhesive tape and to adhesive tapes suitable for printing and processes of making adhesive tape suitable for printing and of printing adhesive tape. The invention is concerned particularly with normally tacky and pressure-sensitive, non-fibrous, film-backed adhesive tapes, the best known of which have adhesives of the rubber-resin type, but which may also be composed of polymers incorporating both rubbery and resinous properties within the polymer. In preferred aspects it is concerned with normally tacky and pressure-sensitive adhesive tape that is wound up in a roll with contact between adhesive coated and the adhesive-free sides of adjacent convolutions in the roll, and that is unwound thereafter before use.

Film-backed normally tacky and pressure-sensitive adhesive tapes have always been difficult to print. When the usual film-backed tape is printed, the print offsets when the tape is rolled and unrolled, particularly if the printed tape is retained in roll form for prolonged periods of time or at elevated temperatures. In many cases printing increases adhesion to backing to such an extent that the film tape breaks and tears during unrolling or use. Theoretically it may be possible to anchor the print by applying double coats, one before and one after printing, or by isolating the printing between two films, laminated so as to prevent contact between the adhesive and the printing layer. Constructions of these types, however, are costly and result in bulky, unduly thick tapes that are unsightly and inconvenient to use, if not inoperative. In addition, in such constructions the printing tends to run, so that a poorly defined impression results after overcoating and lamination.

It is an object of the invention to provide products and processes resulting in an ink impression anchored so tightly that no overcoating is necessary. A further object of the invention is provision of normally tacky and pressure-sensitive printed film tape wherein ink lifting and ink transfer are prevented even when the ink impression is in direct contact with strong adhesive. A still further object is provision of ink impressions on tape that are adapted to withstand a wide variety of conditions. Yet a further object is provision of an economical process for efficient pressure-sensitive film tape printing and of economical, efficient film tape for printing and printed film tape. Still further objects of the invention will be readily apparent from the following description of the invention, which shows several preferred forms of the invention furnished by way of example only and not to limit the scope of the invention.

In accordance with the invention, printed film tape is made by coating the film on one side with the adhesive coating or combination of coatings, which may include a primer for the adhesive, for instance as shown in Billings Patent No. 2,340,298, issued February 1, 1944, and mirror coated on the other side with a patternless, substantially wax- and plasticizer-free fine polymeric coating. This mirror coating involves applying on the film side opposed to the adhesive a very thin coating, using pattern-free solvent combinations. The mirror-coated film may then be printed directly on the mirror coating, preferably using inks having a resinous binder, sometimes also called flexigraphic inks.

The preferred backing film of the invention is a highly moisture-sensitive film, and moisture-sensitive films are the ones most difficult to print successfully and permanently in absence of the invention, particularly when the finished printed product encounters conditions of relatively high humidity. For many purposes cellophane is preferred, although the invention may be applied to other highly moisture-sensitive, flexible, high tensile films. Backings involving combinations of films with strands, fibers, fiber webs, e. g. paper or non-woven fabric, or other films may be substituted for plain films, provided that the smooth film with the mirror coating appears on the side available to accept the printing impression. The preferred film is a regenerated cellulose film of a thickness of from about one-half to about two and one-half mils, plasticized with from about five to about fifteen percent of its weight of glycerine or glycerine substitute, i.e. g., water-soluble glycol plasticizer.

The preferred mirror coating is applied by knife coating, finely etched roll, kiss coating or release or reverse roll coating to a coating weight preferably not more than one-quarter of one ounce per square yard, and for good results not more than half of one ounce per square yard, and comprises a material in its substantially unplasticized wax-free state having affinity for the moisture-sensitive film, preferably polyvinyl alcohol, carboxy methyl cellulose, hydroxy ethyl cellulose, methyl cellulose, glue or casein. Within the above-stated coating weight limits the mirror coating thickness that is preferred depends upon the inherent flexibility or brittleness of the coating materials, while a continuous coating as thin as possible without pattern formation is generally most desirable.

The printing ink used may be any ink having a resinous binder, sometimes called flexigraphic ink. Among preferred inks are inks based on binders such as shellac, ethyl cellulose and nitrocellulose. Among preferred solvents for the ink are the lower aliphatic alcohols and the lower aliphatic esters, e. g., ethyl acetate. The amount and type of solvent is regulated so as to give the ink the desired drying speed and degree of penetration.

Typical inks are:

*Ink Example A*

| | Parts by weight |
|---|---|
| Victoria Blue R 275 (color index 728) | 20 |
| Ethyl cellulose | 5 |
| Dissolved in methylated spirits | 175 |

*Ink Example B*

| | Parts by weight |
|---|---|
| Diacetone alcohol | 200 |
| National nigrosine base N | 20 |
| Orange shellac | 80 |

*Ink Example C*

| | Parts by weight |
|---|---|
| Methylated spirits | 87 |
| Ethyl cellulose | 8 |
| White shellac | 20 |
| Titanium oxide (the above milled to smooth paste) | 45 |
| ADD: | |
| Ethyl cellulose | 26 |
| Dissolved in methylated spirits | 60 |
| Followed by methyl Violet 2B | 8 |
| And Rotor Violet BG | 8 |
| Dissolved in methylated spirits | 64 |
| Add Methylcyclohexanone and mix thoroughly | 33 |

Examples of preferred forms of the invention follow:

Example I

A regenerated cellulose film known as cellophane 600PUT77 is primed, using any rubber latex or synthetic rubber latex-polyvinyl alcohol primer, e. g., the primer disclosed in Billings Patent No. 2,340,298, patented February 1, 1944, to a dry coating weight of .01 to .03 ounce per square yard, and is supercoated to a coating weight of one ounce per square yard with a normally tacky and pressure-sensitive adhesive mass of the following formulation:

| | Parts by weight |
|---|---|
| Crude natural rubber, pale crepe, well broken down | 39 |
| Rosin, dehydrogenated | 30 |
| Filler such as zinc oxide and aluminum hydrate | 30 |
| Antioxidant | 1 |

The adhesive tape is then mirror coated in accordance with the foregoing specification, using an etched roll coater and a coating weight of one-tenth of one ounce per square yard, with an unplasticized waxless coating composed of polyvinyl alcohol having a hydroxyl content of from about fifty-five to about ninety-nine percent applied from a solvent composed of sixty parts by weight of water and forty parts by weight of isopropyl alcohol.

Very good results were obtained on printing this adhesive tape on the mirror coating, using resin bonded inks and any conventional printing process. Amounts of ink sufficient to give very good legibility and solid, dark impressions did not transfer, even after prolonged storage of the tape and under conditions of relatively high humidity.

Example II

Adhesive tape was made substantially in the manner of Example I, except that the mirror coating was applied by a knife coater and comprised carboxy methyl cellulose, applied without creating a pattern on the cellophane, in absence of wax, to a dry coating weight of two-tenths of an ounce per square yard, using a solvent composition comprising equal parts by weight of a ketone, e. g., acetone, and water. The following normally tacky and pressure-sensitive adhesive was applied after the primer and mirror coating in a tandem operation:

| | Parts by weight |
|---|---|
| A 75% butadiene, 25% styrene copolymer, well broken down from a Mooney value of 70 | 10 |
| Crude smoked sheet rubber | 20 |
| Titanium dioxide filler | 20 |
| Lanolin | 7 |
| Phenol-modified terpene resin | 25 |
| Red pigment | 6 |
| Antioxidant | 2 |

Very good, durable printing resulted in this case.

Example III

A one and one-half mil regenerated cellulose film was used. To this film were applied in one coating and drying operation a butadiene-styrene latex primer comprising polyvinyl alcohol in accordance with the Billings patent and also a patternless mirror coating comprising a waxless hydroxy ethyl cellulose solution in fifty parts denatured ethyl alcohol and fifty parts water. The primer and the mirror coating were applied to opposite sides of the film, the primer to a coating weight of two-tenths of an ounce per square yard and the mirror coating to a coating weight of .001 ounce per square yard. Using nitrocellulose bonded flexigraphic ink, very satisfactory, secure, permanent impressions resulted on the mirror coating.

Either before or after printing, an adhesive was applied to the primed side of the backing, to a coating weight of one and one-half ounces per square yard, comprising the following formula:

| | Parts by weight |
|---|---|
| Crude natural rubber, well broken down on the rubber mill | 60 |
| Oil-modified phenolic resin | 2 |
| Hydrogenated rosin glyceride | 35 |
| Alkylated polyhydroxy phenol | 0.6 |
| Lecithin | 2 |

Example IV

This product was prepared in every respect the same as Example I, except that the primer used was a rubber rosin primer comprising two parts by weight latex crepe rubber and four parts by weight of pine pitch or wood rosin, in accordance with Drew Patent No. 2,236,567, patented April 1, 1941, and employed the adhesive of Example III. The mirror coating employed comprised sixty-six percent by weight polyvinyl alcohol of the previously described type and thirty-four percent ethyl cellulose. It was applied from a solution comprising fifty-five percent pure alcohol and forty-five percent water.

Example V

The product of this example was prepared in all respects the same as Example I, except that the mirror coating employed was composed of twenty-five percent cellulose acetate and seventy-five percent polyvinyl alcohol. This mirror coating was applied to a coating weight of .05 of an ounce per square yard from a solvent composition comprising equal parts of toluene and of a methyl ethyl ketone.

Example VI

This example was prepared in all respects the same as Example I, except that the mirror coating comprising from about five to about thirty-five parts by weight of polyvinyl acetate and from ninety-five to sixty-five parts by weight of polyvinyl alcohol. The polyvinyl acetate was added in the form of a thirty-five percent by weight solution in toluene into the polyvinyl alcohol solution, which was in a fifteen percent by weight solution of alcohol in water.

Example VII

This example was prepared in all respects the same as Example I, except that the mirror coating comprised thirty parts of polyvinyl butyral and seventy parts of polyvinyl alcohol. The polyvinyl butyral was added in a twenty percent by weight solution in toluene to a solution of polyvinyl alcohol as in the preceding example.

Example VIII

This example was prepared in all respects the same as Example I, except that the mirror coating comprised seventy-five percent polyvinyl alcohol, twenty-two percent polyvinyl butyral and three percent tri-ethylene glycol di-2-ethyl-butyrate. The additions to the polyvinyl alcohol were again made from solution in toluene which was emulsified in the water-alcohol solution of the polyvinyl alcohol.

The mirror coating may be applied from concentrations varying from one-tenth of one percent to about fifty percent by weight. The preferred concentration range depends in each case upon the preferred viscosity of materials used and upon the desired dry weight.

Reference is now made to the accompanying drawing illustrating in vertical cross section the novel tape of the present invention. The tape comprises a cellulosic backing 1 having on one side a coating 2 of a normally tacky and pressure-sensitive adhesive and on the opposite side a mirror coating 3 for anchoring ink impressions 4 to said backing 1.

The invention has been described in its preferred form, and many modifications thereof are included within its spirit.

The claims are:

1. A normally tacky and pressure-sensitive adhesive sheet comprising a pressure-sensitive adhesive united to one surface of a flexible, non-fibrous, moisture-sensitive cellulosic backing film, and, united to the other surface of said backing, a continuous mirror coating comprising at least a major proportion of at least one member of the group consisting of polyvinyl alcohol, carboxy methyl cellulose, hydroxy ethyl cellulose, methyl cellulose, glue and casein, and, applied directly to said continuous mirror coating, resinous binder ink impressions, said sheet being in package form wherein the printed side of said mirror coating directly contacts said adhesive.

2. A product in accordance with claim 1 wherein said mirror coating comprises polyvinyl alcohol.

3. A product in accordance with claim 1 wherein said backing is regenerated cellulose film.

4. A product in accordance with claim 3 wherein said mirror coating is composed of polyvinyl alcohol.

5. A product in accordance with claim 4 wherein the adhesive is of the rubber-resin type.

References Cited in the file of this patent

UNITED STATES PATENTS

| | | |
|---|---|---|
| 2,269,712 | Drew | Jan. 13, 1942 |
| 2,438,195 | Tierney | Mar. 23, 1948 |
| 2,599,576 | Morris | June 10, 1952 |
| 2,607,711 | Hendricks | Aug. 19, 1952 |
| 2,656,286 | Fisher | Oct. 20, 1953 |